United States Patent
Chen

(10) Patent No.: US 9,981,320 B1
(45) Date of Patent: May 29, 2018

(54) SHRINK FIT TOOL HOLDER ASSEMBLY

(71) Applicant: Ching-Ting Chen, Taichung (TW)

(72) Inventor: Ching-Ting Chen, Taichung (TW)

( * ) Notice: Subject to any disclaimer, the term of this patent is extended or adjusted under 35 U.S.C. 154(b) by 0 days. days.

(21) Appl. No.: 15/410,864

(22) Filed: Jan. 20, 2017

(51) Int. Cl.
*B23B 31/107* (2006.01)
*B23B 31/117* (2006.01)

(52) U.S. Cl.
CPC ...... *B23B 31/1072* (2013.01); *B23B 31/1179* (2013.01); *B23B 2231/026* (2013.01); *Y10T 279/17923* (2015.01); *Y10T 279/17965* (2015.01)

(58) Field of Classification Search
CPC . B23B 31/107; B23B 31/1072; B23B 31/117; B23B 31/1179; Y10T 279/17837; Y10T 279/17923; Y10T 279/17957; Y10T 279/17965
See application file for complete search history.

(56) References Cited

U.S. PATENT DOCUMENTS

| | | | | |
|---|---|---|---|---|
| 271,143 | A * | 1/1883 | Smith | F16B 7/182 211/183 |
| 2,801,860 | A * | 8/1957 | Getts | B23B 31/113 279/23.1 |
| 5,341,710 | A * | 8/1994 | Peuterbaugh | B23B 29/04 279/83 |
| 7,077,608 | B2 * | 7/2006 | Hartman | B23B 31/008 279/102 |
| 8,505,893 | B2 * | 8/2013 | Haimer | B23B 31/005 269/309 |
| 8,656,573 | B2 * | 2/2014 | Freyermuth | B23B 31/008 279/102 |
| 8,668,411 | B2 * | 3/2014 | Guy | B23B 27/007 279/71 |
| 9,254,525 | B2 * | 2/2016 | Mizoguchi | B23B 31/005 |
| 2005/0135187 | A1 * | 6/2005 | Essing | B23B 31/1072 366/331 |
| 2005/0285355 | A1 * | 12/2005 | Lin | B23B 31/1071 279/81 |
| 2013/0115023 | A1 * | 5/2013 | Haimer | B23C 5/26 409/234 |

FOREIGN PATENT DOCUMENTS

| | | | | |
|---|---|---|---|---|
| DE | 102010034889 A1 * | 2/2012 | | B23B 31/1179 |
| DE | 102013108999 A1 * | 2/2014 | | B23B 31/008 |

* cited by examiner

*Primary Examiner* — Eric A Gates
(74) *Attorney, Agent, or Firm* — Rosenberg, Klein & Lee

(57) ABSTRACT

A shrink fit tool holder assembly has a holder, a tool, and two fastening units. The holder has an axis, an inserting portion, and a fastening hole defined through the inserting portion. The inserting portion has two assembling holes communicating with the fastening hole. Each one of the two assembling holes has an extending axis inclined relative to the axis of the holder. The two extending axes of the two assembling holes are a pair of skew lines. The tool has a shank section inserted in the fastening hole of the holder. The shank section has two engaging grooves. The two fastening units are respectively inserted into the two assembling holes and respectively engage with the two engaging grooves to prevent the tool from sliding or rotating relative to the holder.

4 Claims, 3 Drawing Sheets

SHRINK FIT TOOL HOLDER ASSEMBLY

BACKGROUND OF THE INVENTION

1. Field of the Invention

The present invention relates to a machine tool, and more particularly to a shrink fit tool holder assembly that is capable of holding a tool firmly.

2. Description of Related Art

A conventional shrink fit tool holder is designed for overcoming inaccuracy occurring in tool holding. The conventional shrink fit tool holder has a center hole with a diameter. The conventional shrink fit tool holder is heated to increase the diameter of the center hole for containing a tool. As the temperature of the conventional tool holder is lowered, the diameter of the center hole decreases and enables the center hole to shrink for firmly holding the tool. However, the center hole after shrinking is unable to fully restrict the tool. The tool still has a chance to slide relative to the conventional shrink fit tool holder, so the conventional shrink fit tool holder is not safe enough and not accurate enough during machining.

To overcome the shortcomings of the conventional shrink fit tool holder, the present invention provides a shrink fit tool holder assembly to mitigate or obviate the aforementioned problems.

SUMMARY OF THE INVENTION

The main objective of the present invention is to provide a shrink fit tool holder assembly that can promote safety in use and accuracy in machining.

The shrink fit tool holder assembly comprises a holder, a tool, and two fastening units. The holder has an axis, an inserting portion, and a fastening hole defined through the inserting portion. The inserting portion has two assembling holes communicating with the fastening hole. Each one of the two assembling holes has an extending axis inclined relative to the axis of the holder. The two extending axes of the two assembling holes are a pair of skew lines. The tool has a shank section inserted in the fastening hole of the holder. The shank section has two engaging grooves. The two fastening units are respectively inserted into the two assembling holes and respectively engage with the two engaging grooves to prevent the tool from sliding or rotating relative to the holder.

Other objects, advantages, and novel features of the invention will become more apparent from the following detailed description when taken in conjunction with the accompanying drawings.

DETAILED DESCRIPTION OF PREFERRED EMBODIMENT

Figure 1:
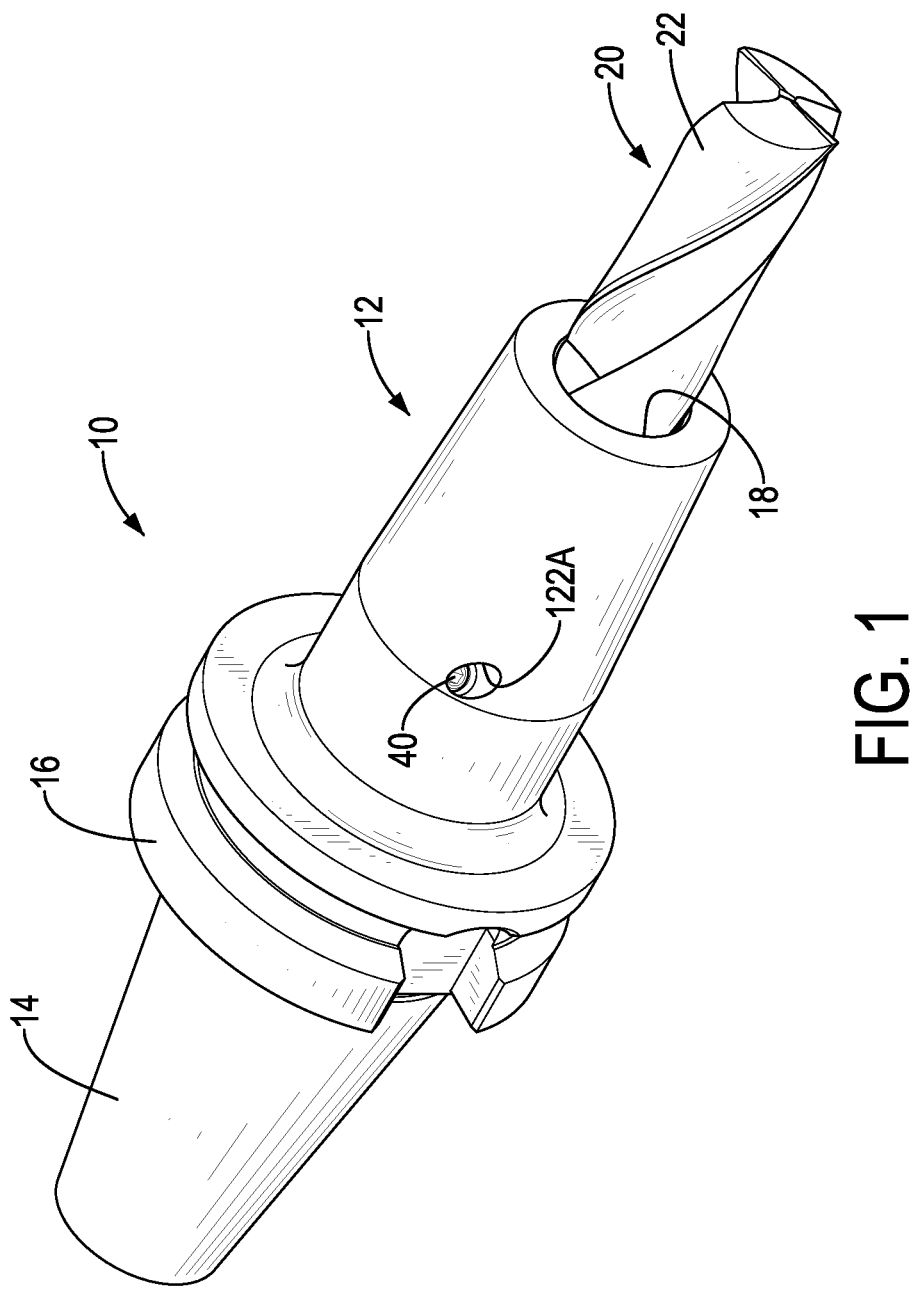
FIG. 1 is a perspective view of a shrink fit tool holder assembly in accordance with the present invention.
Figure 2:
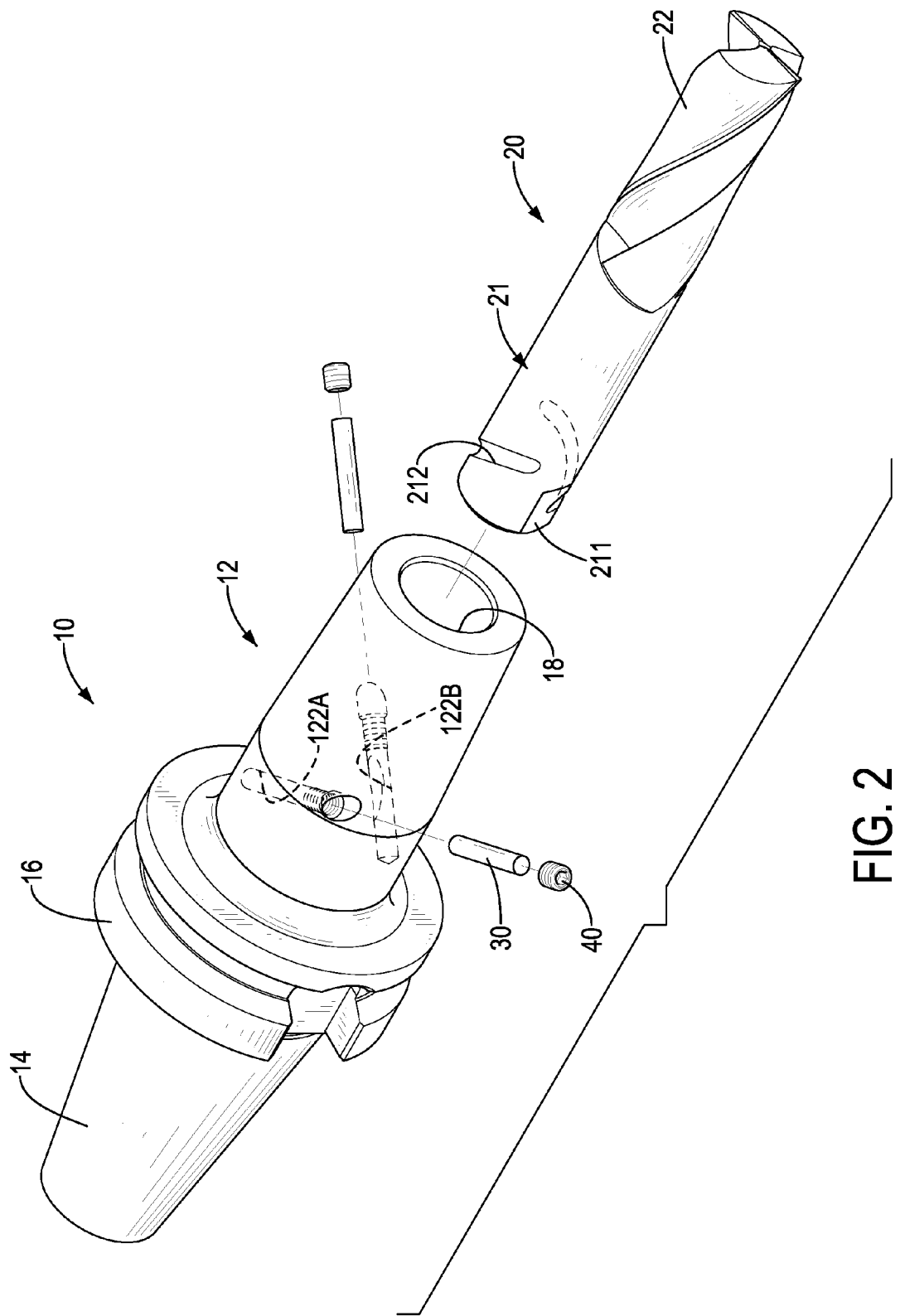
FIG. 2 is an exploded perspective view of the shrink fit tool holder assembly in FIG. 1.
Figure 3:
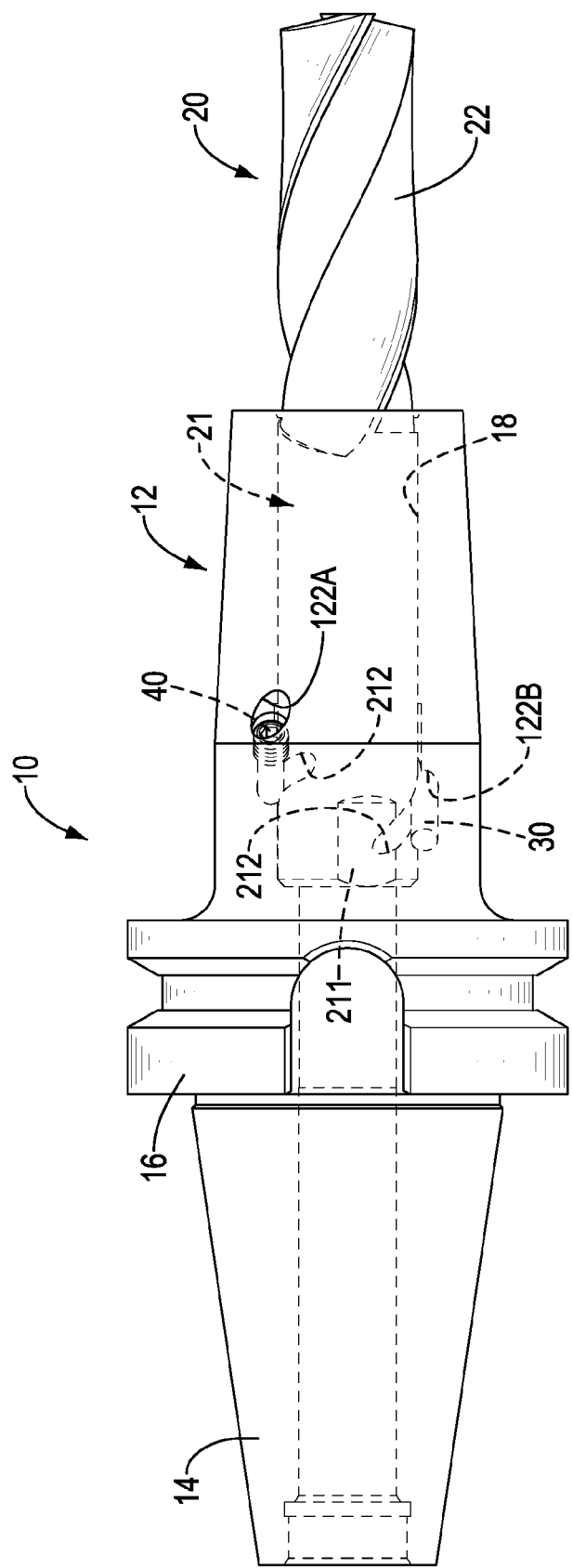
FIG. 3 is a side view of the shrink fit tool holder assembly in FIG. 1.

With reference to FIGS. 1 to 3, a shrink fit tool holder assembly in accordance with the present invention comprises a holder 10, a tool 20, two fastening units 30, and two positioning units 40.

The holder 10 has an axis, a first end, a second end, an inserting portion 12, a fixing portion 14, a flange portion 16, and a fastening hole 18. The first end and the second end of the holder 10 are opposite each other along the axis of the holder 10. The inserting portion 12 is disposed at the first end of the holder 10 and has a peripheral surface and two assembling holes. The two assembling holes are defined in the peripheral surface of the inserting portion 12.

With reference to FIGS. 1 to 3, the two assembling holes are identical in structure and are respectively a first assembling hole 122A and a second assembling hole 122B. Take the first assembling hole 122A as an example for further elaborations. The first assembling hole 122A is a blind hole and has an extending axis, an end portion, a receiving section, and a threaded portion. The extending axis of the first assembling hole 122A is inclined relative to the axis of the holder 10. The end portion, the receiving section, and the threaded portion of the first assembling hole 122A are disposed along the extending axis of the first assembling hole 122A.

The receiving section of the first assembling hole 122A is disposed between the end portion and the threaded portion of the first assembling hole 122A. The first assembling hole 122A and the second assembling hole 122B are spaced from each other at equal intervals on the peripheral surface of the inserting portion 12. The first assembling hole 122A and the second assembling hole 122B are spaced from each other by the axis of the holder 10. And the two extending axes of the first assembling hole 122A and the second assembling hole 122B are a pair of skew lines. The two end portions of the first assembling hole 122A and the second assembling hole 122B face the second end of the holder 10.

With reference to FIGS. 1 to 3, the inserting portion 12 is deposited at the first end of the holder 10 and the fixing portion 14 is disposed at the second end of the holder 10. The flange portion 16 is disposed between the first end and the second end of the holder 10. The flange portion 16 has two opposite ends respectively connected to the inserting portion 12 and the fixing portion 14. The fastening hole 18 is axially defined through the inserting portion 12, the fixing portion 14, and the flange portion 16. The fastening hole 18 has an inner face, and the fastening hole 18 communicates with the first assembling hole 122A of the inserting portion 12.

With reference to FIG. 1, FIG. 2, and FIG. 3, the tool 20 is disposed at the first end of the holder 10. The tool 20 has a shank section 21 and a blade section 22. The shank section 21 of the tool 20 is inserted in the fastening hole 18 of the holder 10. The shank section 21 has an inserting end, an outer face, two flat faces 211, and two engaging grooves 212. The inserting end of the shank section 21 is away from the blade section 22 and faces the fixing portion 14 of the holder 10. The outer face of the shank section 21 contacts the inner face of the fastening hole 18. The two flat faces 211 are defined on the outer face of the shank section 21 and are adjacent to the inserting end of the shank section 21. The two flat faces 211 are parallel and are diametrically opposite each other. The two flat faces 211 of the shank section 21 are utilized as indexes for adjusting orientation of the tool 20 and are convenient for assembling the tool 20. Each one of the two engaging grooves 212 is spirally defined in the outer face of the shank section 21 and has a first end and a second end. The first end of each one of the two engaging grooves 212 faces the blade section 22 of the tool 20 and faces the first end of the holder 10. The two engaging grooves 212 are respectively corresponding in position to the first assembling hole 122A and the second assembling hole 122B. The two second ends of the two engaging grooves 212 respectively extend to the two flat faces 211 of the shank section 21.

With reference to FIGS. 1 to 3, each one of the two fastening units 30 is a round rod. The two fastening units 30 are respectively inserted into the first assembling hole 122A and the second assembling hole 122B of the inserting portion 12 and are respectively engaged with the two engaging grooves 212 of the shank section 21.

With reference to FIGS. 1 to 3, each one of the two positioning units 40 has a thread. The two positioning units 40 are respectively screwed with the two threaded portions of the first assembling hole 122A and the second assembling hole 122B. The two positioning units 40 respectively abut against the two fastening units 30. The two positioning units 40 keep the two fastening units 30 remaining respectively inside the first assembling hole 122A and the second assembling hole 122B of the inserting portion 12. The two positioning units 40 also ensure that the two fastening units 30 respectively engage the two engaging grooves 212 of the shank section 21.

With reference to FIGS. 1 to 3, for assembling the tool 20 into the fastening hole 18 of the holder 10, the two flat faces 211 respectively face the end portion of the first assembling hole 122A and the end portion of the second assembling hole 122B. And the two engaging grooves 212 of the shank section 21 respectively communicate with the first assembling hole 122A and the second assembling hole 122B of the inserting portion 12 to allow the two fastening units 30 to be respectively inserted into the first assembling hole 122A and the second assembling hole 122B and to respectively engage with the two engaging grooves 212 as well. The two fastening units 30, which are respectively inserted into the first assembling hole 122A and the second assembling hole 122B and respectively engaged with the two engaging grooves 212, are able to prevent the tool 20 from sliding or rotating relative to the holder 10. The shrink fit tool holder assembly in accordance with present invention enhances safety in use and accuracy in machining.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A shrink fit tool holder assembly comprising:
   a holder having
      an axis;
      a first end;
      a second end opposite the first end of the holder along the axis of the holder;
      an inserting portion disposed at the first end of the holder and having a peripheral surface; and
      two assembling holes defined in the peripheral surface of the inserting portion, each one of the two assembling holes having
         an extending axis inclined relative to the axis of the holder;
      the two extending axes of the two assembling holes being a pair of skew lines;
      a fixing portion disposed at the second end of the holder;
      a flange portion disposed between the inserting portion and the fixing portion; and
      a fastening hole axially defined through the inserting portion, the fixing portion, and the flange portion, the fastening hole communicating with the two assembling holes and having
         an inner face;
   a tool having
      a shank section inserted in the fastening hole and having
         an inserting end facing to the fixing portion of the holder;
         an outer face contacting the inner face of the fastening hole;
         two flat faces defined on the outer face of the shank section and being adjacent to the inserting end of the shank section; and
         two engaging grooves spirally defined in the outer face of the shank section and corresponding in position to the two assembling holes of the inserting portion, and each one of the two engaging grooves having a first end and a second end; and
         the two second ends of the two engaging grooves respectively extending to the two flat faces; and
   two fastening units respectively inserted into the two assembling holes of the inserting portion and respectively engaging with the two engaging grooves.

2. The shrink fit tool holder assembly as claimed in claim 1 further having two positioning units respectively screwed with the two assembling holes of the inserting portion of the holder; the two positioning units respectively abutting against the two fastening units.

3. The shrink fit tool holder assembly as claimed in claim 2, wherein the two assembling holes are spaced from each other by the axis of the holder and are spaced from each other at equal intervals on the peripheral surface of the inserting portion.

4. The shrink fit tool holder assembly as claimed in claim 1, wherein the two assembling holes are spaced from each other by the axis of the holder and are spaced from each other at equal intervals on the peripheral surface of the inserting portion.

* * * * *